United States Patent
Halat et al.

(10) Patent No.: US 6,705,685 B1
(45) Date of Patent: Mar. 16, 2004

(54) METHOD AND DEVICE FOR CONTROLLING THE TRACTION SLIP OF A VEHICLE WITH A HIGH COEFFICIENT OF FRICTION

(75) Inventors: Siegfried Halat, Darmstadt (DE); Ulrich Stöckmann, Darmstadt (DE); Bernd-Uwe Hartmann, Gründau (DE); Cyrus Kerfekhah, Darmstadt (DE); Christian Schuhmacher, Usingen (DE); Ronald Nies, Reichelsheim (DE)

(73) Assignee: Continental Teves AG & Co. OHG, Frankfurt (DE)

(*) Notice: Subject to any disclaimer, the term of this patent is extended or adjusted under 35 U.S.C. 154(b) by 0 days.

(21) Appl. No.: 09/674,026

(22) PCT Filed: Mar. 26, 1999

(86) PCT No.: PCT/EP99/02069

§ 371 (c)(1), (2), (4) Date: Aug. 22, 2001

(87) PCT Pub. No.: WO99/55565

PCT Pub. Date: Nov. 4, 1999

(30) Foreign Application Priority Data

Apr. 24, 1998 (DE) .......................... 198 18 222
Oct. 27, 1998 (DE) .......................... 198 49 409

(51) Int. Cl.$^7$ ................................. B60T 8/24
(52) U.S. Cl. ........................ 303/141; 303/139
(58) Field of Search ................ 303/139–145; 180/197

(56) References Cited

U.S. PATENT DOCUMENTS

| | | | | |
|---|---|---|---|---|
| 5,351,779 A | * | 10/1994 | Yamashita | 180/197 |
| 5,353,225 A | * | 10/1994 | Tsuyama et al. | 701/83 |
| 5,573,315 A | * | 11/1996 | Schmitt et al. | 303/141 |
| 5,732,376 A | * | 3/1998 | Hrovat et al. | 701/80 |
| 5,884,719 A | * | 3/1999 | Schramm et al. | 180/197 |
| 6,176,336 B1 | * | 1/2001 | Bourne et al. | 180/197 |
| 6,230,092 B1 | * | 5/2001 | Becker et al. | 180/197 |

FOREIGN PATENT DOCUMENTS

| | | |
|---|---|---|
| DE | 37 42 244 | 4/1989 |
| DE | 41 20 579 | 1/1992 |
| DE | 41 22 345 | 1/1992 |
| DE | 40 35 531 | 5/1992 |
| DE | 42 36 004 | 4/1994 |
| DE | 195 48 564 | 6/1997 |
| WO | 98 22304 | 5/1998 |

* cited by examiner

Primary Examiner—Robert A. Siconolfi
(74) Attorney, Agent, or Firm—Rader, Fishman & Grauer PLLC

(57) ABSTRACT

A system for controlling the traction slip of a vehicle including identifying a start situation with a high coefficient of friction uphill or with a heavy vehicle load, and once the start situation is identified and traction slip prevails, reducing a brake control intervention and/or increasing the nominal engine torque.

15 Claims, 2 Drawing Sheets

METHOD AND DEVICE FOR CONTROLLING THE TRACTION SLIP OF A VEHICLE WITH A HIGH COEFFICIENT OF FRICTION

TECHNICAL FIELD

The present invention generally relates to traction control systems and more particularly relates to a method and a device for controlling the traction slip of a vehicle with a high coefficient of friction.

BACKGROUND OF THE INVENTION

Traction slip basically means that the wheels rotate faster than what is expected for a given vehicle speed. This condition frequently occurs during starting to drive, especially when the clutch is engaged or when the gas pedal is applied vigorously in low gear. In this event, the drive torque is in excess of the moment which can be transmitted between the wheels and the roadway due to the frictional conditions prevailing between the two.

FIG. 1 is a schematic view of a vehicle from the top, it being assumed that the vehicle has a front-wheel drive. Reference numeral 11 relates to the left front wheel, 12 to the right front wheel, 13 to the right rear wheel, and 14 to the left rear wheel. Consequently, wheels 11 and 12 may encounter traction slip.

A principal aim is the limitation of traction slip. On the one hand, excessive traction slip causes loss in traction because only a comparatively low force can be transmitted between tires and road surface when the wheels spin greatly. On the other hand, major tire wear and driving situations which are not defined optimally in terms of driving stability will occur as a result.

Therefore, attempts have been made by conventional traction slip control systems to limit the traction slip to an optimal value. This can be done by reducing the propulsive power and/or by braking the driven wheels. Adverse effects may be caused thereby in the event that an extremely high torque requirement exists during starting to drive, for example, when starting to drive uphill or starting with a heavy load (baggage, passengers, roof load, trailer). In this case, traction slip is even more likely to occur because the forces or torques to be overcome are higher. Conventional traction slip control systems frequently cause stalling of the engine because the engine with a heavy load is decelerated below the at least necessary rotational speed, either due to engine torque reduction or due to braking with the clutch engaged. Vehicle start is then possible only with the traction slip control system deactivated.

An object of the present invention is to provide a method and a device for traction slip control at a high coefficient of friction which permit the vehicle to start even with a heavy vehicle load.

According to one aspect of this invention, the situation with a comparatively heavy starting load is identified. More particularly, various conditions can be polled or examined in this respect. According to another aspect of the present invention, the identification is followed by taking a countermeasure to the end that instantaneously higher traction slip values are accepted than is in conformity with conventional aims of traction slip control. For example, this may be effected by reducing a brake control intervention and/or by reducing the nominal engine torque decrease or by a nominal engine torque increase.

The traction slip control system according to the present invention may be provided in addition to conventional traction slip control systems. The conventional system basically operates as usual. Only in the event that the start situation described hereinabove is identified will the conventionally generated nominal values or actuating signals for the brake and/or the engine be modified or replaced according to the present invention.

DETAILED DESCRIPTION OF THE PREFERRED EMBODIMENTS

Figure 1:
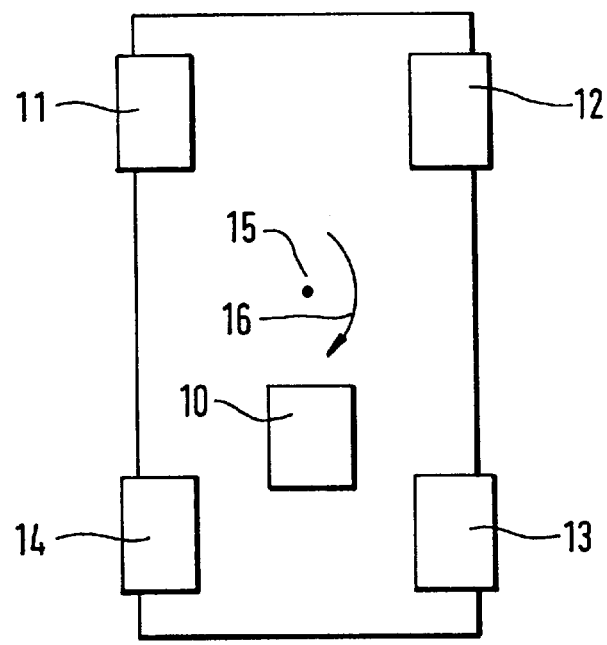
FIG. 1 is a schematic top view of a vehicle.
Figure 2:
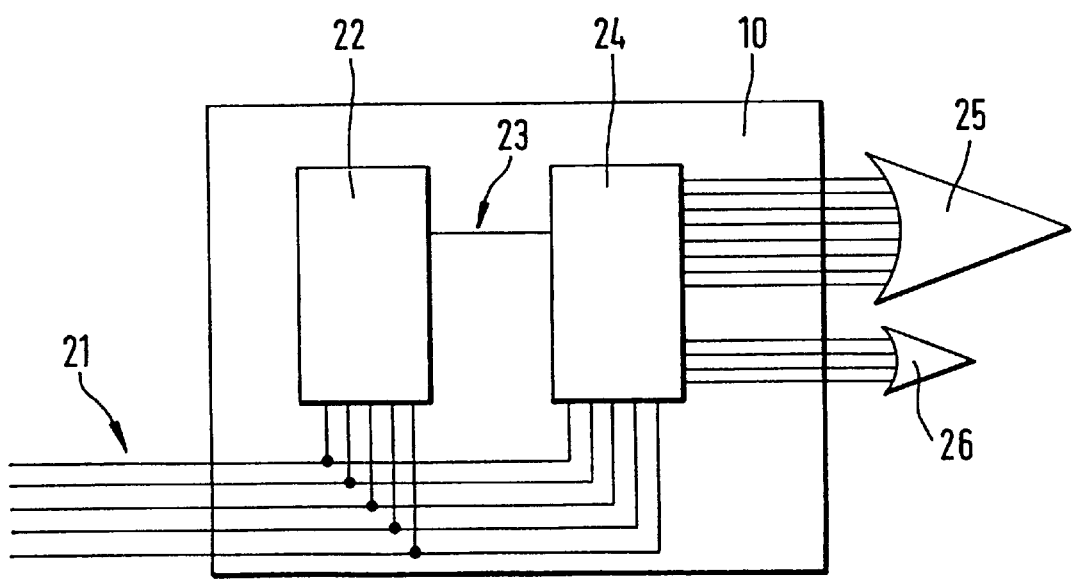
FIG. 2 is a schematic block diagram showing the components of traction slip control which are essential for this invention.

The embodiment of FIG. 2 shows a traction slip control system with an identification device 22 and a vehicle actuation control 24. The traction slip control system 10 basically receives input signals 21 and sends actuating signals 25 to the brake system and/or actuating signals 26 to the vehicle engine. The input signals 21 may be of most different types and taken from most different sources. Signal sources may be sensors, other components of the vehicle control, accumulators, or similar elements. The signals 21 can be taken from the sources directly, or they can be taken from a vehicle data bus where they have previously been stored. In particular, the signals 21 may include the wheel signals of the wheels of the vehicle, the vehicle reference speed, brake pressure signals, and similar data. Depending on the requirements, these input signals 21 are evaluated in the identification device 22 and in the actuating device 24. When the identification device 22 identifies the situation with a heavy starting load, it will output an identification signal 23 which transmits qualitative, and possibly also quantitative, data to the actuating device 24 so that the actuating device 24, in turn, can generate appropriate actuating signals 25 for the vehicle brake and 26 for the engine.

Figure 3:
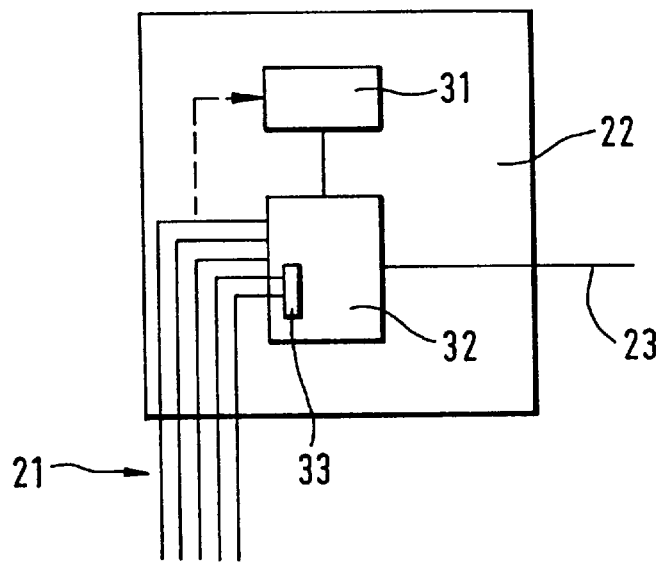
FIG. 3 is the identification device of FIG. 2.

FIG. 3 shows the identification device 22 in greater detail. The identification device 22 includes a checking device 32. The checking device 32 receives from a preset value output 31 different nominal values which, in turn, may depend on defined input signals. Input signals are compared with nominal values in the checking device 32. In addition, input signals can be compared directly with one another in a comparator 33.

More specifically, one or more of the following checking operations or polls may be carried out in the checking device 32: it is checked whether

- the actual engine torque is in excess of a first threshold value,
- the running performance of the wheels, especially the driven wheels, is synchronous within determined limits,
- the traction slip of at least one wheel or the sum of the traction slips of the driven wheels is below a second threshold value,
- the acceleration of a traction slip or of a driven wheel or their sum per axle or the acceleration of the engine is more negative than a negative third threshold value.

In addition, it can be checked whether the vehicle reference speed is below a fourth threshold value.

Once the tests made all have 'yes' as a result, the situation is identified as a situation with a heavy starting load, and a corresponding signal 23 is output.

The actual engine torque is checked in order to obtain a first sign of the heavy starting load. Preferably, the first threshold value is chosen higher than a moment required for conventional start situations.

The synchronous running performance is checked to preclude situations with a split coefficient of friction (where the wheel with a low coefficient of friction has a great traction slip and the wheel with a high coefficient of friction has a lower traction slip or no traction slip at all). To this end, the wheel accelerations and/or the wheel slips and/or the wheel speeds of the driven wheels are compared, and synchronous running is identified if a difference is less than a suitable threshold value.

The amount of traction slip is checked individually or as a sum of both driven wheels as to whether it is below a second threshold value. If this is the case, the intended intervention is assumed to become successful inasmuch as stalling of the engine is prevented by an increase of the traction slip. If, on the other hand, traction slip has a high amount anyway, the intended measure is not promising and, therefore, may be omitted. Approximately the same considerations apply with respect to checking the acceleration of the traction slip or of a driven wheel or, respectively, the sums per axle or the acceleration of the engine. If the accelerations are more negative than a negative third threshold value, this indicates that there is a tendency of the engine stalling so that the intervention according to the present invention is promising.

To further rule out incorrect identifications, it is checked whether the vehicle reference speed falls below a fourth threshold value. The fourth threshold value can be set so that 'starting speeds' are identified, e.g., those speeds below 10 km/h.

In order to make a distinction of start situations with a low coefficient of friction (for both wheels), the traction slip may additionally be checked as to whether it is within a time window after commencement of the control within a defined range of values. If in total a low coefficient of friction prevails (for example, due to snowy road surfaces), traction slip will be or become comparatively high. Other traction slip control strategies may be more appropriate with a low coefficient of friction.

Figure 4:
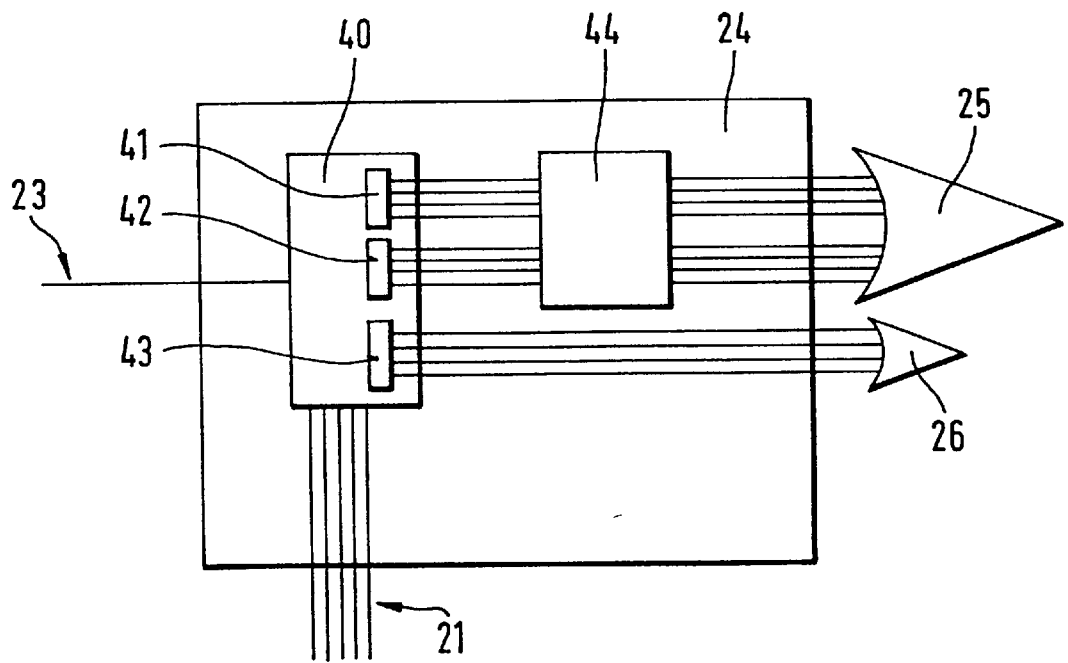
FIG. 4 is the vehicle actuation control of FIG. 2.

FIG. 4 shows an embodiment of the actuation control device 24. It includes a preset value output 40 and an actuating signal generating means 44. The preset value output 40 has a preset value output 41 for brake pressures, a preset value output 42 for brake pressure gradients, and a preset value output 43 for engine parameters. The actuating signal generating means 44 generates actuating signals 25 for the valves of the wheel brakes. Signals 25 are sent to the valve block. The nominal values 26 for the engine are also sent to appropriate control elements or other control components. Especially, the preset value output 40 receives the identification signal 23 and, in response thereto, generates the necessary nominal values, and reference is also made to the respectively other input signals 21.

One possible measure is to suppress, discontinue or reduce a brake control intervention (starting from the traction slip control). Brake pressure nominal values can be decreased and/or reduced with a negative gradient. Brake intervention by the driver remains unaffected thereby.

In addition, the engine and, more particularly, its torque can be influenced by way of the preset value output for engine parameters or by way of an engine interface 43.

According to the present invention, the engine torque can be increased after identification, for example, by increasing the nominal engine torque. Different strategies can be pursued in this regard. Also, exclusion criteria for influencing the engine torque can be checked. The influencing of the engine torque can be left undone if the rotational speed is in excess of a defined threshold value (which indicates a quick-running engine), or it may be stopped if the rotational speed gradient is more positive than a negative threshold value of a smaller amount.

When the engine torque is influenced, it is increased. The increase may be an increase by a fixed amount. The torque may be increased by a first amount, when the engine rotational speed falls below a fifth threshold value, and it may be increased by a second, higher amount when the engine rotational speed gradient falls below a negative sixth threshold value. Also, engine torque control may be effected, with the said torque being P-controlled or PD-controlled in accordance with the engine rotational speed.

What is claimed is:

1. Method for controlling the traction slip of a vehicle, comprising the following steps:

identifying a start condition with a high coefficient of friction uphill or with a heavy vehicle load, and once the start situation is identified and traction slip prevails, reducing a brake control intervention or increasing the nominal engine torque checking whether the actual engine torque is in excess of a first threshold value, checking whether the running performance of the wheels is synchronous within defined limits, checking whether the traction slip of at least one wheel or the sum of the traction slips of the driven wheels is below a second threshold value, checking whether the acceleration of a traction slip of a driven wheel or the sum per axle thereof or the acceleration of the engine rotational speed is more negative than a negative third threshold value.

2. Method as claimed in claim 1, further including the step of checking the vehicle speed to determine if it is below a fourth threshold value.

3. Method as claimed in claim 1, further including the step of setting the first threshold value to be higher than a torque value required when starting to drive on a level roadway.

4. Method as claimed in claim 1, further including differencing the wheel accelerations or the wheel slips or the wheel speeds of the driven wheels, and running is identified as synchronous once the difference is smaller than a respective threshold value.

5. Method as claimed in claim 1, checking the slip of at least one wheel of the driven axle as to whether it is within a predetermined range within a predetermined time window after control commencement within a defined range of values.

6. Method as claimed in claim 5, wherein the time window lasts 300 to 700 msec.

7. Method as claimed in claim 1, wherein following the identification, the brake control intervention is discontinued or prevented.

8. Method as claimed in claim 1, wherein the nominal engine torque is increased in accordance with the engine rotational speed or in accordance with the engine rotational speed gradient.

9. Method as claimed in claim 8, wherein the nominal engine torque is increased by a first amount once the engine rotational speed falls below a fifth threshold value, and is increased by a second, higher amount once the engine rotational speed gradient falls below a negative sixth threshold value.

10. Method as claimed in claim 8, wherein the engine torque is PD-controlled, P-controlled or D-controlled, in accordance with the engine rotational speed.

11. Device for controlling the traction slip of a vehicle, comprising:

means for identifying a start situation with a high coefficient of friction uphill or with a heavy vehicle load, and means for actuating which reduces a brake control intervention or increases the nominal engine torque once the start situation is identified and traction slip prevails wherein the identification device includes a checking device for checking whether the actual engine torque is in excess of a first threshold value, or whether the running performance of the wheels within defined limits is synchronous, or whether the traction slip of at least one wheel or the sum of the traction slip of the driven wheels is below a second threshold value, or whether the acceleration of a traction slip or a driven wheel or the sum per axle thereof or the acceleration of the engine rotational speed is more negative than a negative third threshold value further including a comparison device for comparing the wheel accelerations or the wheel slips or the wheel speeds of the driven wheels, and synchronous running is identified once a difference is smaller than a respectively corresponding threshold value.

12. Device as claimed in claim 11, wherein the checking device checks whether the vehicle speed is below a fourth threshold value.

13. Device as claimed in claim 11, further including a setting device for setting the first threshold value higher than a torque value which is required when starting to drive on a level roadway.

14. Device as claimed in claim 11, further including means for checking the slip of at least one wheel of the driven axle as to whether it is within a predetermined range within a predetermined time window after control commencement within a defined range of values.

15. Device as claimed in claim 11, further including an engine interface for increasing the nominal engine torque in accordance with the engine rotational speed or in accordance with the engine rotational speed gradient.

* * * * *